Aug. 12, 1969  R. W. RHINEHART ET AL  3,460,177
AIRCRAFT WASHING SYSTEM

Filed Aug. 28, 1967  9 Sheets-Sheet 1

INVENTORS
RICHARD W. RHINEHART
HENRY L. CONN
HOWARD E. MORRIS

BY *Browne, Schuyler & Beveridge*
ATTORNEYS

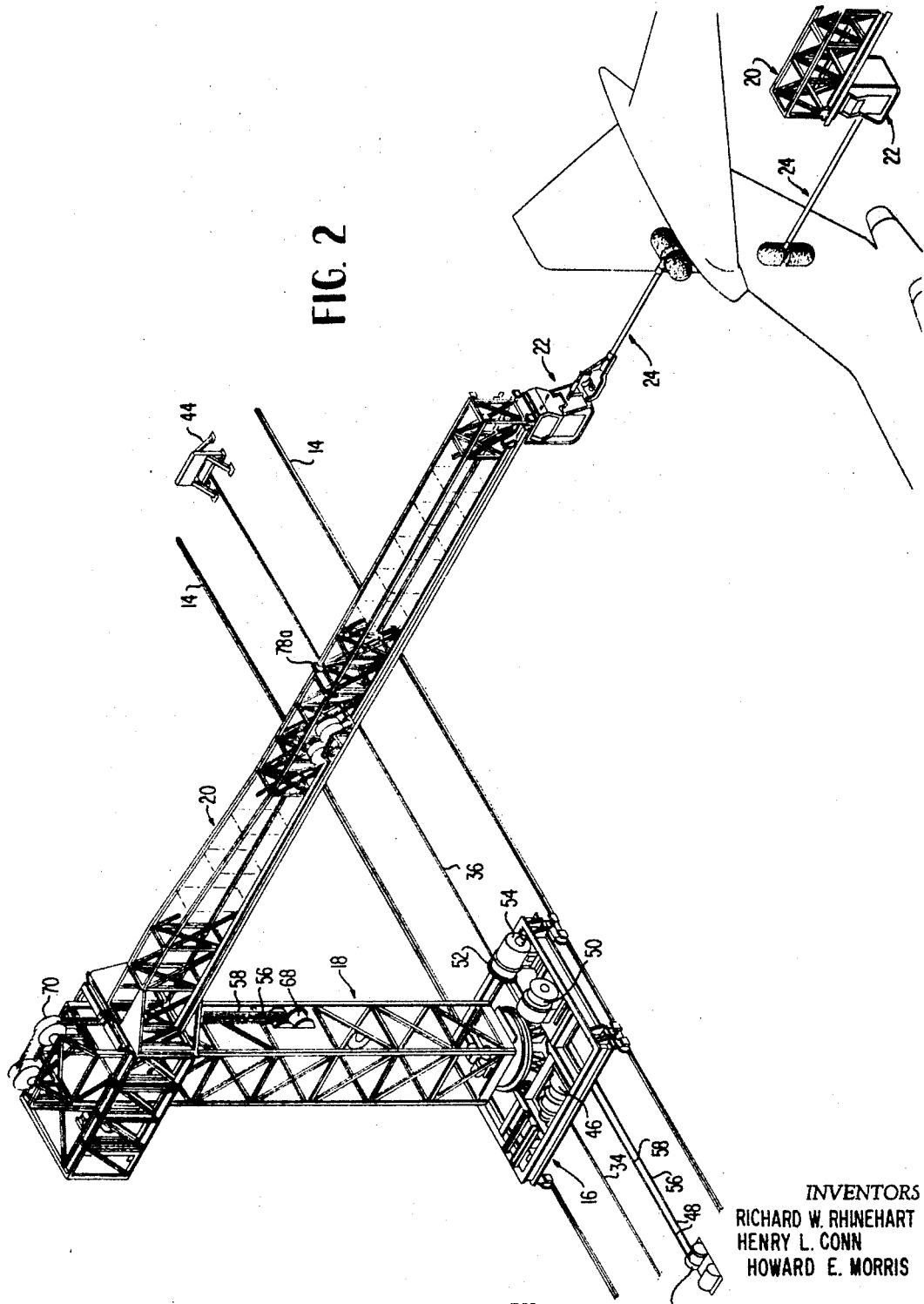

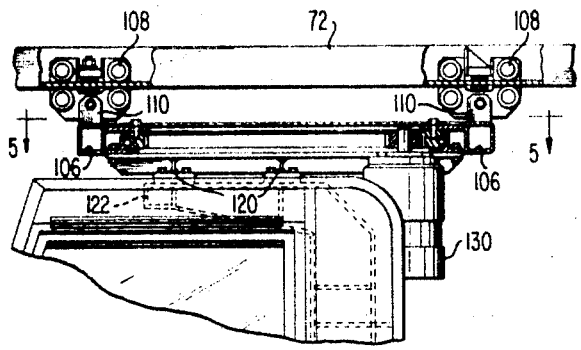
FIG. 4
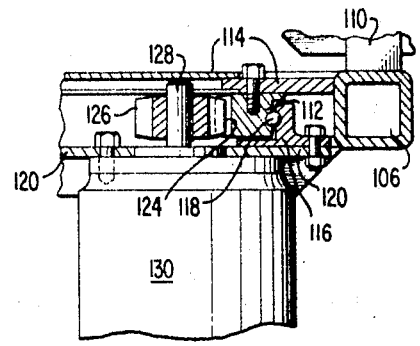
FIG. 6
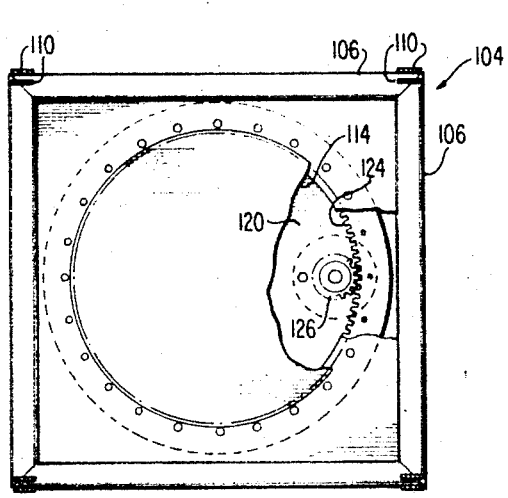
FIG. 5
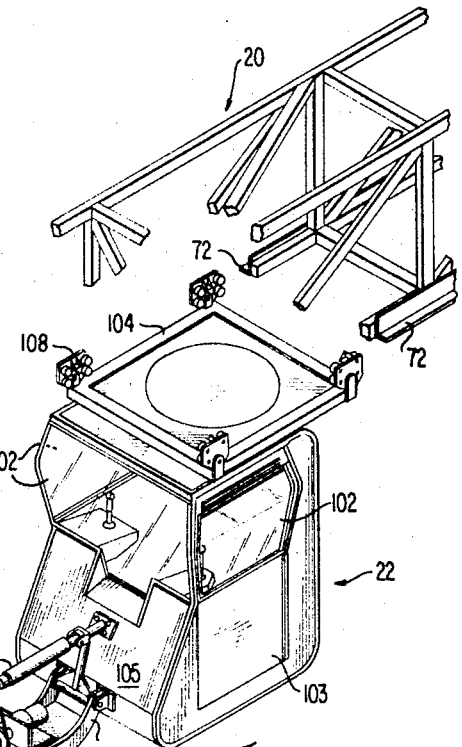
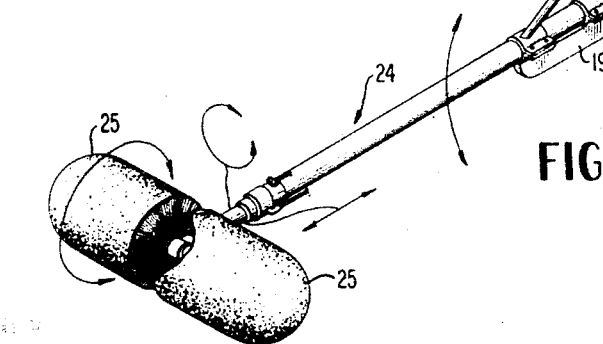
FIG. 3
INVENTORS
RICHARD W. RHINEHART
HENRY L. CONN
HOWARD E. MORRIS
BY Browne, Schuyler & Beveridge
ATTORNEYS

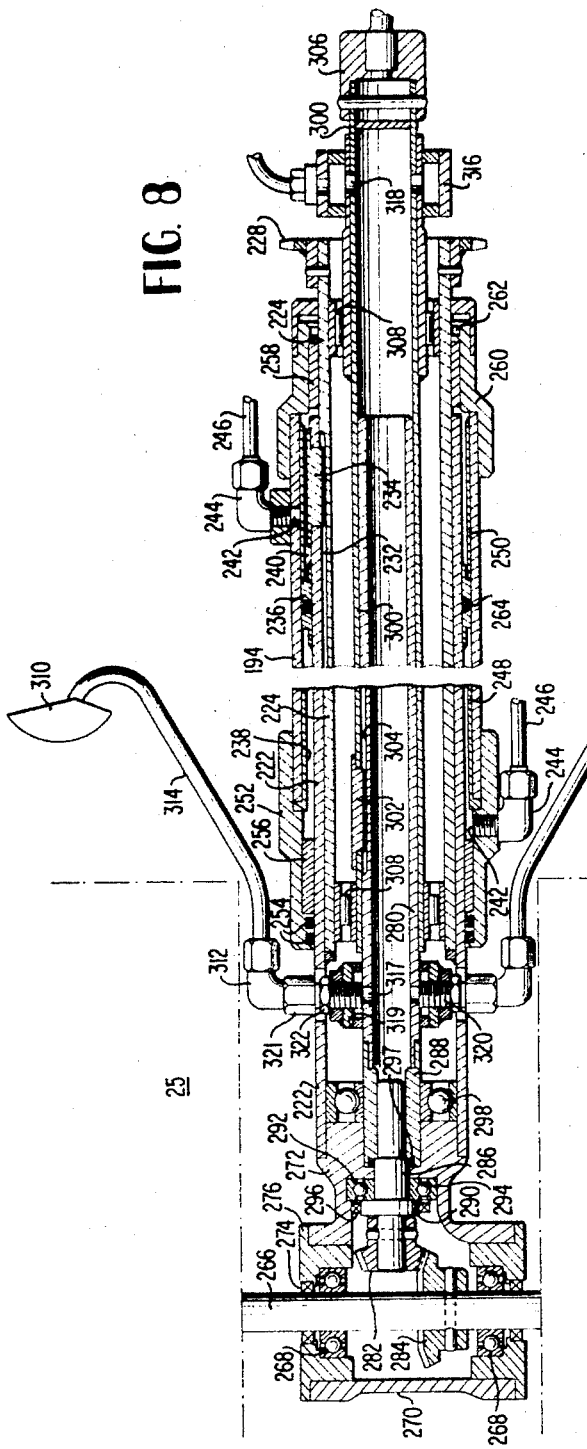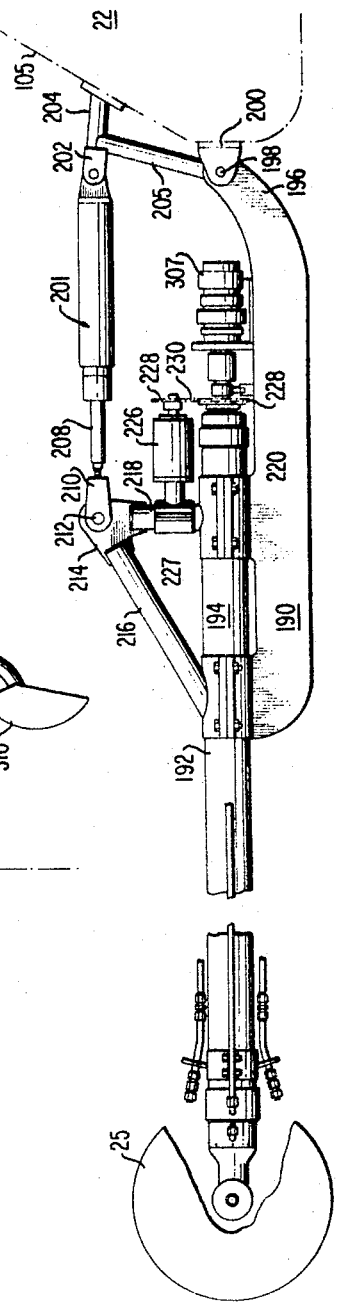
INVENTORS
RICHARD W. RHINEHART
HENRY L. CONN
HOWARD E. MORRIS
BY Browne, Schuyler & Beveridge
ATTORNEYS Aug. 12, 1969  R. W. RHINEHART ET AL  3,460,177
AIRCRAFT WASHING SYSTEM
Filed Aug. 28, 1967  9 Sheets-Sheet 5
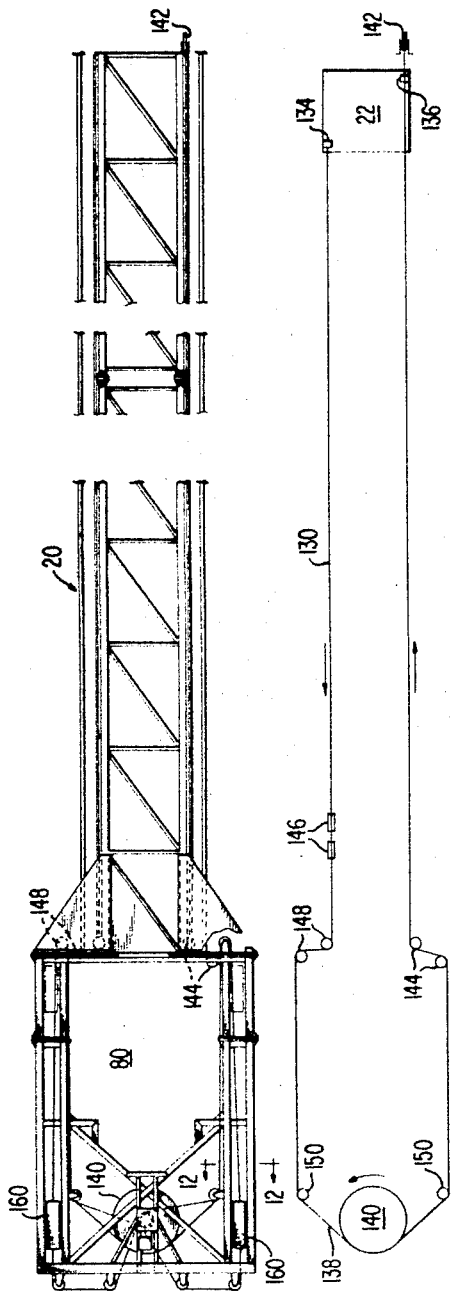
FIG. 9
FIG. 10
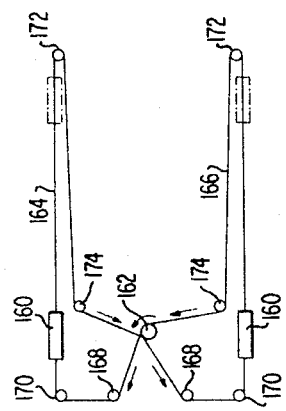
FIG. 11
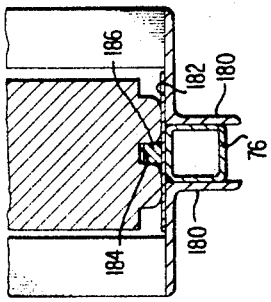
FIG. 12
INVENTORS
RICHARD W. RHINEHART
HENRY L. CONN
HOWARD E. MORRIS
BY Browne, Schuyler & Beveridge
ATTORNEYS Aug. 12, 1969   R. W. RHINEHART ET AL   3,460,177
AIRCRAFT WASHING SYSTEM
Filed Aug. 28, 1967   9 Sheets-Sheet 6
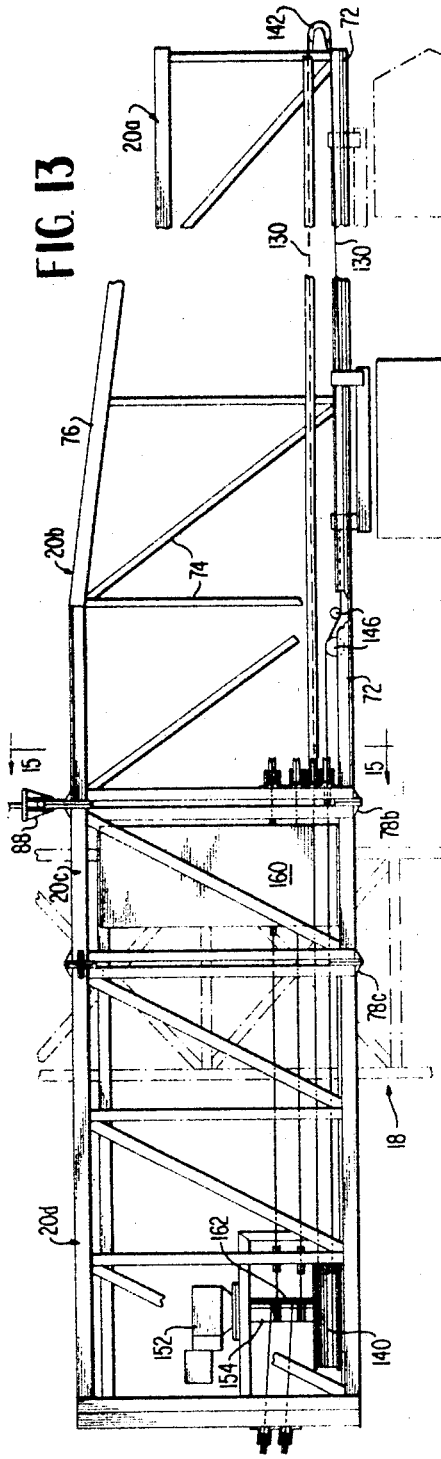
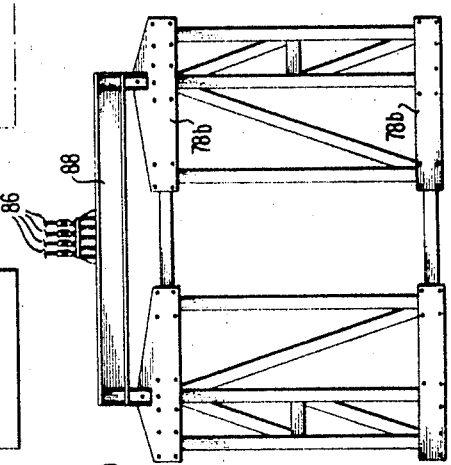
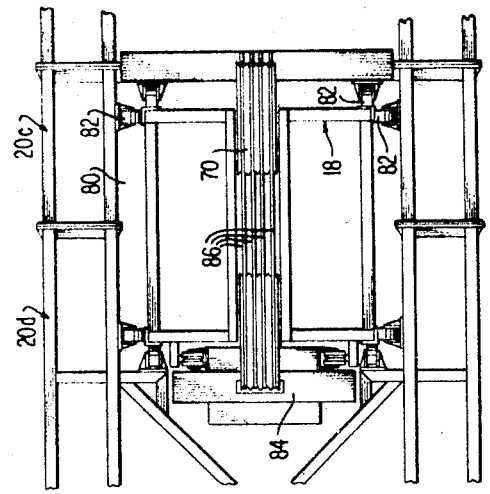
INVENTORS
RICHARD W. RHINEHART
HENRY L. CONN
HOWARD E. MORRIS
BY *Browne, Schuyler & Beveridge*
ATTORNEYS

INVENTORS
RICHARD W. RHINEHART
HENRY L. CONN
HOWARD E. MORRIS

BY Browne, Schuyler & Beveridge

ATTORNEYS

INVENTORS
RICHARD W. RHINEHART
HENRY L. CONN
HOWARD E. MORRIS

BY *Browne, Schuyler & Beveridge*

ATTORNEYS

INVENTORS
RICHARD W. RHINEHART
HENRY L. CONN
HOWARD E. MORRIS

United States Patent Office 3,460,177
Patented Aug. 12, 1969

3,460,177
AIRCRAFT WASHING SYSTEM
Richard W. Rhinehart, Huntsville, Henry L. Conn, Athens, and Howard E. Morris, Florence, Ala., assignors to Brown Engineering Company, Inc., Huntsville, Ala., a corporation of California
Filed Aug. 28, 1967, Ser. No. 663,694
Int. Cl. B60s 3/04; B64f 5/00; A47l 11/38
U.S. Cl. 15—21       23 Claims

ABSTRACT OF THE DISCLOSURE

For washing aircraft or similarly large structures, a system including a tower movable horizontally along a fixed path on the ground surface, an arm supported on, and projecting from the tower towards the aircraft to be washed and a mobile unit including a washing brush assembly movable along the arm towards and away from the aircraft. To obtain the desired washing level, the arm is movable vertically along the tower which may also be rotated to further position the arm at various angles to the fixed path on the ground surface. In addition to being movable along the arm, the mobile unit is also rotatable relative to the arm to place the brush assembly at various angles relative to the arm. At the extremity of the brush assembly one or more rotatable cleaning brushes are engageable with the aircraft for washing. An extendible and retractable boom in the brush assembly positions the brush adjacent the aircraft surface and the brush assembly may be pivoted relative to the mobile unit to press the brush against the aircraft surface for washing. Further adjustment of the brush may be achieved by rotating the extendible and retractable boom. Detergent or other washing fluid may also be dispensed from the brush assembly through nozzles located adjacent the brushes. Cable systems are employed to translate the tower, arm and mobile unit. Hydraulic motors drive the cable systems, and the associated power lines are wound on drums supported on the components to accommodate their different positions.

SUMMARY OF OBJECTS AND INVENTION

This invention relates to a washing system for large vehicles such as aircraft or other similarly large structures. Additionally, this invention pertains to a novel washing brush assembly included in the system as well as certain other subassemblies as will be apparent hereinafter.

An object of this invention is to provide a novel and effective system for washing aircraft or other similarly large structures. Included herein is such a system which will produce a high quality wash in a minimum time and with minimum labor and cost.

A further object of this invention is to provide such an aircraft washing system which will wash aircraft of various sizes and shapes and without sacrificing performance.

Another object of the present invention is the provision of such a system which is easy and safe to operate while being durable and reliable even under rugged and adverse conditions of use.

A still further object of the present invention is to provide a novel cleaning brush assembly incorporated in the system. Included herein is such a brush assembly which is adjustable in various directions to selectively position it for a desired washing operation.

A system achieving the above objects includes a tower mounted on a base that is movable along a fixed path such as a track extending on the ground surface along side the aircraft to be washed. Projecting in cantilever fashion from the tower and towards the aircraft, is an arm which may have any suitable trussed construction. Movable along the arm is a mobile unit which has on its forward side a brush assembly including a rotatable washing brush engageable with the surface of the aircraft to perform the washing operation. Proper positioning of the brush with respect to the surface of the aircraft being washed is obtained by movement of the various system components. In this latter regard, the tower is adjustable about its vertical axis with respect to the base while the arm is movable vertically along the tower into the desired level. In addition to being movable along the arm, the mobile unit is rotatable about a vertical axis relative to the arm. The brush assembly is rotatable and is extendible and retractable relative to the mobile unit. Furthermore the brush assembly may pivot in a vertical plane relative to the mobile unit. The brush assembly also has provisions for dispensing a detergent or other fluid on the brush for use in the washing operation.

Translation of the base along the track is obtained through a cable system including two drums and two cables respectively attached to the drums and to fixed points along the ground surface. Support and vertical movement of the arm along the tower is obtained through a cable system which includes a counterweight that biases the arm upwardly. Another cable system is employed to move the mobile unit along the arm. This cable system incorporates a number of counterweights for balancing the mobile unit with respect to the tower, the counterweights being movable in a direction opposite to the mobile unit.

Preferably the cable systems are driven by hydraulic motors respectively associated with each cable system. Flexible power lines to the hydraulic motors are wound on reels mounted on the components for extension or retraction depending on the position of the components.

The hydraulic motors for operating various components of the system are selectively controlled through a hydraulic system located on the tower. Control is such that certain components may be isolated while others are operated through individual actuation of valves which control the flow of hydraulic fluid from the reservoir to the hydraulic motors. Hand operated controls for the various components are provided in a cabin incorporated in the mobile unit which moves along the arm. A single operator sitting in the cabin may selectively control all of the components in the system.

Other objects and advantages of the present invention will become apparent from the following detailed description in conjunction with the attached drawings in which:

FIG. 2 is a perspective view showing a full washing unit and a portion of a second washing unit included in the system while operating on the tail of the aircraft;

FIG. 3 is a perspective view of a cabin and brush assembly included in the system together with a fragment of an arm which supports the cabin and brush assembly.

FIG. 4 is a vertical cross-sectional view of an upper portion of the cabin illustrating its rotatable and slidable mountings wtih respect to the arm from which it is suspended;

FIG. 5 is a cross-sectional view taken generally along lines 5—5 of FIG. 4 and with certain parts broken away to show internal gearing;

FIG. 6 is an enlarged view of the right hand portion of FIG. 4 illustrating the cabin bearing;

FIG. 7 is a side elevational view of the brush assembly with a portion of an included brush broken away and with the front portion of the cabin shown in phantom;

FIG. 8 is a longitudinal cross-sectional view of the brush assembly illustrating its internal parts and with its brushes shown in phantom;

FIG. 9 is a plan view of the arm included in the system and with certain portions broken away;

FIG. 10 is a schematic view illustrating the cable assembly for translating the cabin and brush assembly along the arm;

FIG. 11 is a schematic view illustrating a cable assembly employed for moving counterweights used in balancing the weight of the cabin and brush assembly with respect to the tower;

FIG. 12 is an enlarged cross-sectional view taken generally along lines 12—12 of FIG. 9 illustrating a mounting of one of the counterweights employed for balancing the cabin and brush assembly;

FIG. 13 is a fragmental elevational view showing the arm supported on a tower and including the cabin and brush assembly the outermost position of which is shown in phantom;

FIG. 14 is a fragmental plan view looking downwardly on the tower and including portions of the arm mounted thereon;

FIG. 15 is a view of a flanged section of the arm taken generally along lines 15—15 of FIG. 13;

DETAILED DESCRIPTION

Figure 1:
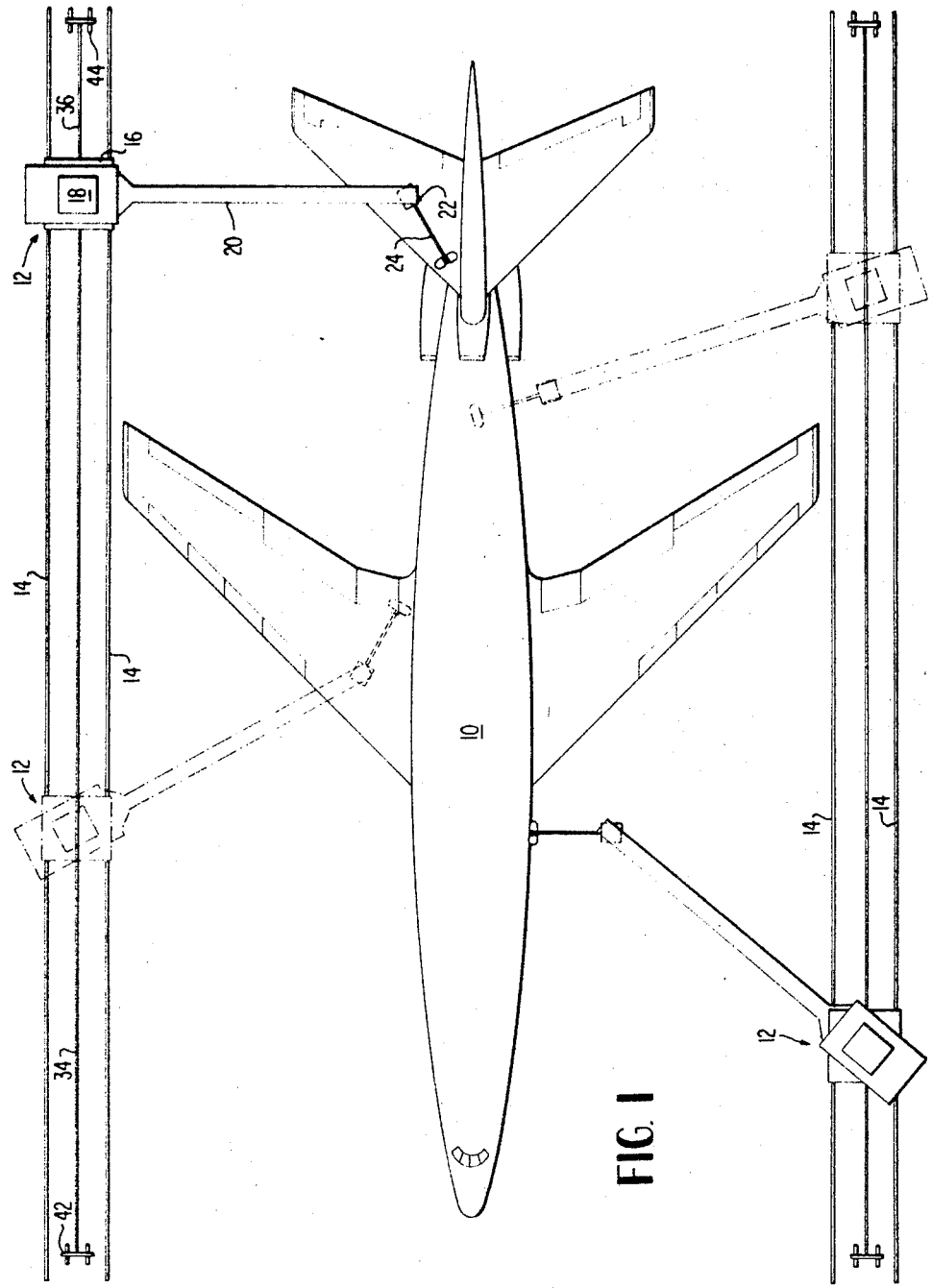
FIG. 1 is a plan view of an aircraft being washed by a system embodying the present invention.

Referring to the drawings in detail, FIG. 1 illustrates a system embodying the present invention for washing an aircraft generally illustrated 10. The system may include one or more units 12 movable along a fixed path extending on the ground surface along side the aircraft, such a path may be formed by a track 14. Preferably two tracks 14 are provided one on each side of a washing station which receives the aircraft so that washer units 12 may operate on opposite sides of the aircraft as illustrated in FIG. 1.

The basic elements included in each washer unit are a base 16 movable along track 14 into various positions (as indicated in phantom in FIG. 1); a tower 18 mounted on the base for movement therewith and also for rotation relative to the base; an arm 20 cantilevered from the tower inwardly towards the aircraft and movable in vertical translation along the tower; a control cabin 22 movable in horizontal translation along the arm towards and away from the aircraft and also rotatable relative to the arm; and a brush or tip assembly 24 attached to the cabin for movement therewith along the arm.

Figure 19:
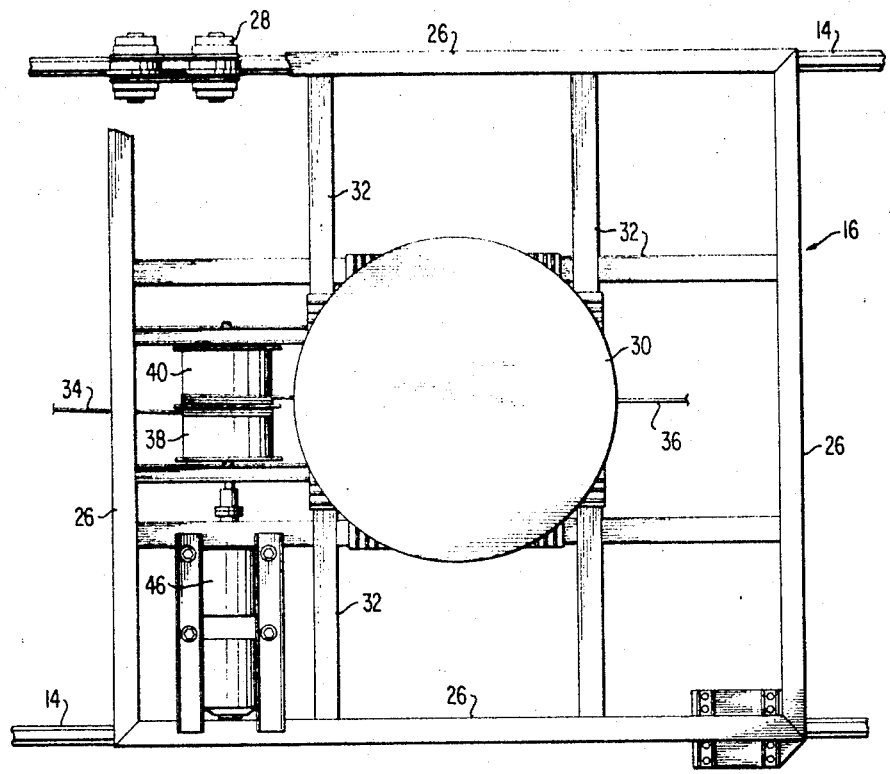
FIG. 19 is an enlarged plan view taken generally along lines 19—19 of FIG. 16.

Referring to FIGS. 2 and 19, base 16 has a square configuration composed of structural steel beams 26 welded together and mounted on rollers or trolleys 28 which are movable along track 14. For rotatably supporting tower 18 a conventional slewing ring generally designated 30 is supported in the center of the base through cross beams 32 which span beams 26.

Translation of the base along track 14 is obtained preferably by a cable system including two cables 34 and 36 having one of their ends wound on drums 38 and 40 respectively and their other ends anchored at fixed points 42 and 44 along track 14. Any suitable reversible motor preferably a hydraulic motor 46 is employed to drive cable drums 38 and 40 for translation of the base. Power and water lines 48 to the various motors which will be described hereinafter are carried on two drums 50, 52 rotatably mounted in base 16 to be driven by a suitable motor preferably a hydraulic motor 54. One drum receives a water line 56 while the other receives an electrical power line 58 which leads to an appropriate outlet facility 60 at the washing area.

Figure 16:
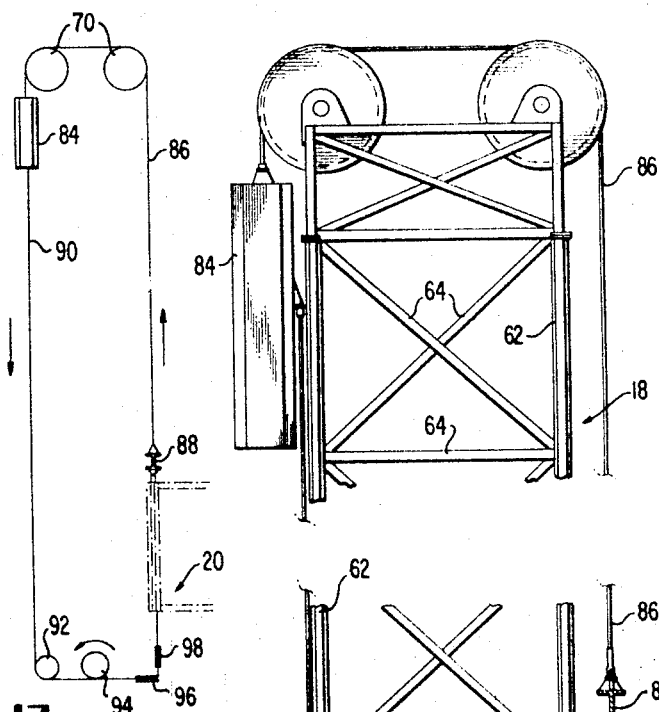
FIG. 16 is an elevational view of the tower and its base assembly and including the arm shown in its lowermost position, certain portions of the tower and arm being broken away.

Referring to FIGS. 2 and 16, tower 18 is preferably comprised of a welded steel trussed structure whose columns 62 are equal leg steel angles with the remaining members 64 being formed from square steel tubes or any other suitable elements of equal strength. At the base of tower 18 is attached support ring 66 which is received on slewing ring assembly 30 of base 16 to which the tower loads are distributed. Through slewing ring assembly 30, the tower may be rotated relative to the base to position arm 20 at a desired angle. Lines 56, 58 are carried on the tower for supporting the functions of the arm, and cabin and brush assembly by means of reels 68 indicated in FIG. 2 as located in the forward side of the tower. At the top of the tower is fixed a sheave assembly 70 for supporting cables employed in vertically translating arm 20 on tower 18 as will be further described.

Arm 20 as shown in FIGS. 2, 9 and 13 is a haunched cantilever pratt truss, the lower cord members 72 of which are preferably formed from steel angles with the remaining elements 74, 76 being formed from square mild steel tubing. Angles 72 forming the lower cord members of the arm not only serve as tracks for the cabin translation but also withstand high localized stresses resulting from the suspension of cabin 22 from the arm. For ease of assembly, alignment and shipping, arm 20 is made in four sections 20a, 20b, 20c and 20d which are attached together at flanges 78a, 78b and 78c to form the arm. Arm sections 20c and 20d are designed to form a generally square vertical passage 80 which receives tower 18 as shown in FIGS. 2 and 14. Spring biased rollers 82 are mounted on the arm in passage 80 to engage corner columns 62 of the tower as shown in FIG. 14; four such rollers 82 engaging each corner of the tower.

Figure 17:
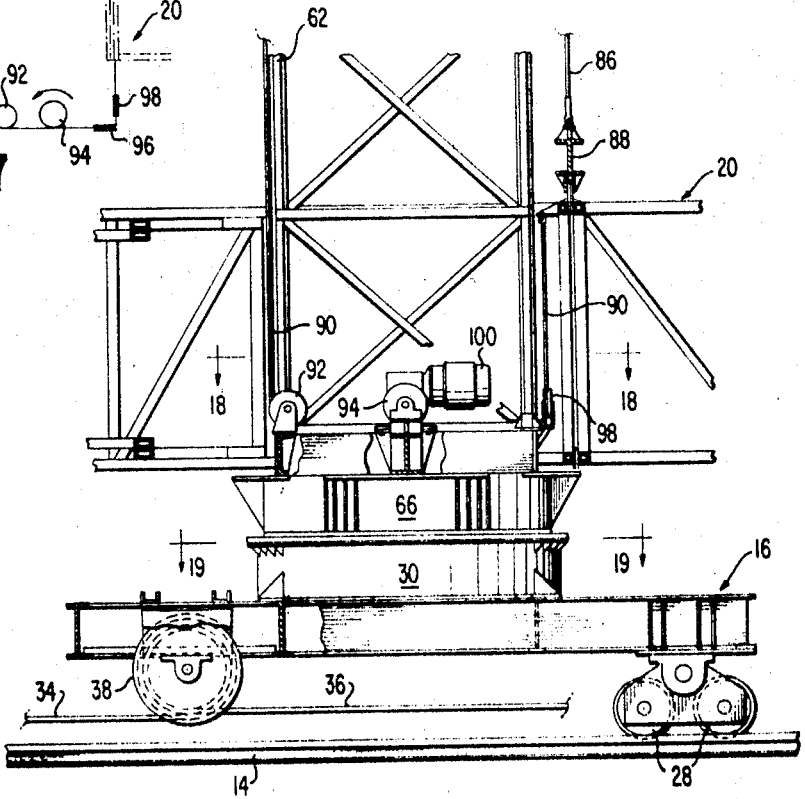
FIG. 17 is a schematic view of a cable system including a counterweight employed for supporting and actuating the arm along the tower.
Figure 18:
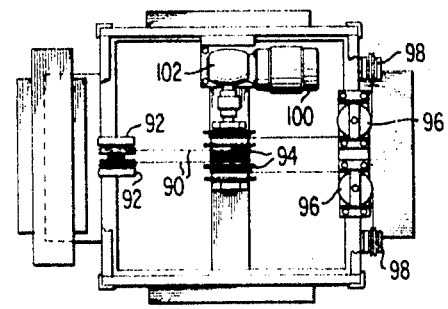
FIG. 18 is a plan view taken generally along lines 18—18 of FIG. 16.

Vertical movement of arm 20 along tower 18 is obtained through a cable system incorporating a counterweight 84 which is slightly heavier than the arm to stabilize and counter balance the arm at the desired level. This cable system includes four cables 86 attached at one of their ends to the arm near the center of gravity of the composite mass of the arm and cabin and brush assembly (including the weight of a man in the cabin). As shown in FIGS. 14 to 16 in the described embodiment, the place of attachment of the cables to the arm is slightly forward of the tower, and the cables are attached to a beam 88 extending transversely over the top of the arm. Extending upwardly from the arm, cables 86 are trained over sheave assembly 70 and then extend downwardly where they are fastened to arm counterweight 84. Two cables 90 are fastened to the arm counterweight and lead downwardly therefrom to pulleys 92 mounted at the base of the tower from which cables 90 lead to drive drums 94 rotatably supported in the center of the tower as shown in FIGS. 16, 17 and 18. From drums 94 cables 90 pass around horizontal pulleys 96 located in the base of the tower (FIG. 18) after which cables 90 pass over vertical pulleys 98 and finally are secured to the arm as shown in FIGS. 16 and 17. To move the arm along the tower, drums 94 are rotated by any suitable motor preferably a variable speed and acceleration hydraulic motor 100 operatively connected to the drums by a suitable gear reducer 102. Since arm counterweight 84 is slightly heavier than the arm, the cable system normally exerts an upward force on the arm to give the arm a buoyant effect. Arm counterweight 84 is accommodated by the construction of arm passage 80 which receives the arm counterweight as shown in FIG. 14.

Control cabin 22 is of a size to accommodate one operator of the system, all of the controls for operating the various components of the system being located within the cabin for manipulation by the operator. As disclosed in FIG. 3 cabin 22 is constructed with large windows 102 on three of its sides to rovide good visibiliity which is enhanced by the V-shape vertical cross-sectional configuration of the windows. In one side of the cabin a suitable door 103 is provided. Below window 102 on the front of the cabin, a panel 105 of sufficient strength is provided for anchoring the brush assembly 24 which will be described hereinafter. Although not shown, a windshield wiper is mounted on the front window of the cabin, while additional comforts and aids such as air conditioning, heating, dehumidifying and an intercommunication system are provided for the cabin.

Suspension of cabin 22 from arm 20 is achieved through an overlying support generally designated 104, which as shown in FIGS. 3 to 6, includes an outer rectangular frame composed of steel tubes 106 and four trolley assemblies 108 mounted at the corners of the support through straps 110 so that the trolley rollers will be engageable on the lower cords 72 of arm 20 which thus serve as a track. At the top of the cabin, a ball bearing assembly rotatably mounts the cabin with respect to the support to allow the cabin to be rotated relative to the arm. This bearing assembly includes an inner ring-like race bolted to a composite plate 114 fixed to frame members 106 of the support as shown in FIG. 6. The outer race 116 is movable on ball bearings 118 around the inner race 112 and is secured to a plate 120 which overlies the top of the cabin and is secured thereto through frame 122.

To drive the cabin in rotation, inner race 112 of the bearing is formed as a ring gear having teeth 124, and a pinion 126 is fixed to a stub shaft 128 to mesh with ring gear 124 in the area between plates 114 and 120. Operatively connected to pinion 126 to drive it is a suitable hydraulic motor 130 mounted at the upper rear of the cabin. If desired, suitable stops (not shown) may be incorporated into the structure to limit rotation of the cabin for example to 135° in either direction from the center line of the arm. Plates 114 and 120 are sealed to exclude foreign matter from the bearing assembly and also for retardation of bearing assembly lubricants.

Referring to FIGS. 9 to 13, translation of cabin 22 along arm 20 is achieved through a cable system including a steel cable 130 of sufficient strength whose opposite ends are connected at 134 and 136 to the cabin with an intermediate portion 138 thereof passing about a drive pulley 140 suitably mounted in the rear of the arm on the side of the tower opposite the cabin. From the point 136 of attachment to the cabin, cable 130 leads forwardly to a vertical guide pulley 142 mounted at the forward extremity of the arm from which the cable leads rearwardly on the arm to laterally spaced horizontal guide pulleys 144 mounted generally at the base of the arm adjacent the tower. From the other point 134 of attachment to the cabin, cable 130 leads rearwardly under and over a pair of vertical guide pulleys 146 and after which it passes around laterally spaced horizontal guide pulleys 148 identical to pulley 144 described above. At the rear of the arm, cable 130 passes about two additional horizontal guide pulleys 150 equally spaced on opposite sides of drive pulley 140 as shown in FIGS. 9 and 10. Depending on the direction of rotation of drive pulley 140, it will be seen that cable 130 will move to translate the cabin 22 outwardly or inwardly along arm 20. Any suitable motor preferably a variable speed and acceleration hydraulic motor 152 may be provided to drive pulley 140. As shown in FIG. 13 motor 152 is suitably mounted on pulley shaft 154 in the rear end of arm 20 above drive pulley 140.

In order to counterbalance the cabin with respect to the tower, a movable counterweight system is incorporated to be operable in connection with the cable system for translating the cabin. In the shown embodiment, the counterweight system includes equal counterweights 160 slidable in opposite sides of the rear portion of arm 20 in a direction opposite to the direction of cabin translation. The total weight of counterweights 160 is linearly proportional to the ratio of distance travelled between the cabin and the counterweights. Thus in one embodiment where counterweights 160 will move one-sixth of the distance moved by the cabin 22, the total weight of the counterweights will be six times that of the cabin.

Movement of counterweights 160 in response movement of the cabin is achieved through a cable system. In the shown form of FIGS. 9, 11 and 13, this system includes a compound drive pulley 162 mounted above the cabin drive pulley shaft 154 to be rotatable therewith by motor 152. The diameter of compound pulley 162 is chosen in accordance with the proportion of movement between the counterweight and cabin as mentioned above, and in the particular embodiment described, the diameter will be one-sixth that of the cabin drive pulley 140. Two counterweight cables 164, 166 are respectively trained about compound pulley 162 each with a counterweight 160 fixed intermediate its ends. From compound pulley 162 cables 164, 166 pass about horizontal guide pulleys 168, 170 mounted in the rear of the arm after which they extend forwardly and over horizontal guide pulleys 172 adjacent the forward end of the tower, after which they return to compound pulley 162 by passing over horizontal guide pulleys 174 situated in the tower on opposite sides of compound pulley 162. Cables 164, 166 are wound on compound pulley 162 in opposite directions so that upon rotation of compound pulley 162, counterweights 160 will move in the same direction. Thus for example when drive pulley 140 rotates in the counterclockwise direction illustrated in FIG. 10, the cabin will move towards the tower and the compound pulley 162 also rotating in the counterclockwise direction will move the counterweights towards the cabin to balance it. Reverse movement of drive pulley 140 will of course have the opposite effect.

Any suitable construction may be incorporated into the arm to accommodate counterweights 160 in their movement between opposite extreme positions illustrated in FIGS. 9 and 11. In one form shown in FIG. 12, steel angle members 180 are welded to the opposite sides of the upper and lower cords 76 of the arm to define upper and lower horizontal surfaces 182 between which the counterweights move. Additionally, counterweights 160 may be formed with grooves 184 in their upper and lower faces to receive an elongated guide member 186 fixed to arm cords 76 to guide the counterweights in their reciprocating movement.

Referring now to FIGS. 3, 7 and 8, brush or tip assembly 24, which includes washing brushes 25, is pivotally connected to the front panel 105 of cabin 22 for movement in a vertical plane from a horizontal position either upwardly or downwardly approximately 30°. In the shown embodiment, this mounting includes a connecting bar 190 having at its forward end a sleeve bracket 192 fixed about the outer casing 194 of the assembly and having its rear section bifurcated to form two sides 196 pivotally mounted about a transverse pin 198 supported in U-shaped brackets 200 fixed to the lower part of cabin panel 105. For pivoting the brush assembly upwardly or downwardly about pin 198, a fluid motor 201 is pivotally supported at its rear in a U-shape bracket 202 anchored by means of an arm 204 with respect to the cabin panel 105. An additional support strut 205 may be interposed between brackets 200 and 202. Projecting from the forward end of motor 201 is a drive rod 208 with a clevis 210 fixed at its extremity to receive pin 212 which passes through a corner plate 214 received between the arms of clevis 210. Fixed between corner plate 214 and sleeve bracket 192 is a diagonal support strut 216 while a short vertical support strut 218 is fixed between corner plate 214 and a second sleeve bracket 220 secured about casing 194 and to connecting bar 190. When motor 201 is actuated to extend rod 208, the brush assembly will pivot downwardly. Retraction of rod 208 will cause upward pivoting of the brush assembly. In addition to adjusting the position of the brush assembly, this movement may be employed to apply brush pressure on the aircraft surface being washed.

Referring to FIG. 8, casing 194 of the brush assembly is an elongated barrel or tube which slidably receives an elongated tubular boom or main brush support 222 that is extendible and retractable along the longitudinal axis of the brush assembly. Boom 222 is telescoped over a positioning tube 224 which projects from the rear of casing 194 where it is operatively connected to a hydraulic motor 226 by means of sprockets 228 and chain 230, to be rotatable for purposes of adjusting the brush assembly. Motor 226 is supported on a bracket including a sleeve 227 fixed about support strut 218.

Transmission of rotation from positioning tube 224 to boom 222 is effected through an elongated key-way 232 formed in positioning tube 224 longitudinally thereof, and key 234 fixed to boom 222 to slide in the key-way. It will be apparent that while rotation of positioning tube 224 will be imparted to boom 222 through the key connection, boom 222 will be free to move longitudinally relative to positioning tube 224 between extended and retracted positions; key 234 moving along key-way 232 during this latter movement.

For driving boom 222 between its extended and retracted positions, a fluid motor cylinder is formed between the boom and casing 194. A fluid responsive piston 236 is fixed about the boom in the fluid chamber to divide the fluid chamber in two parts 238 and 240. Motive fluid is introduced and exhausted into chambers 238, 240 by suitable ports 242 and fittings 244 communicating with conduits 246. It will be appreciated that movement of piston ring 236 in one direction in response to introduction of motive fluid into one of the chambers 238, 240, will also cause movement of the boom in the same direction.

To limit longitudinal movement of the boom in either direction, stops in the form of cylindrical members 248 and 250 are fixed in the chamber to provide shoulders on which piston ring 236 will abut at the limit of its travel. In the shown form stop ring 248 is flanged to be clamped between the forward end of casing 194 and an external coupling member 252 which has a double O-ring seal 254 engaging boom 222 to seal one end of the fluid chamber. The other stop ring 250 may be fixed to the internal surface of casing 194 such as by welding or any other suitable means. A bearing sleeve 256 is interposed between boom 222 and coupling 252. A similar bearing sleeve 258 is inserted between positioning tube 224 and a second coupling element 260 received about the rear end of casing 194. To seal chamber parts 240 an O-ring 262 is provided in rear coupling 260 and another O-ring 264 is inserted in a groove in piston ring 236 to seal chamber parts 238 and 240 from each other.

Thus far, it will be seen that boom 222 may be extended or retracted and also rotated to position brushes 25 on the aircraft surface. Brushes 25 may be further pressured against the aircraft surface by pivoting the brush assembly in a vertical plane about pivot pin 198. In addition to the foregoing, brushes 25 are rotatable during the washing operation. For this purpose brushes 25 are fixed on a shaft 266 extending at right angles to the longitudinal axis of boom 222. Brush shaft 266 is rotatably mounted in ball bearings 268 received in a T member 270 having a stem 272 fixed to the forward end of boom 222 for movement therewith. At the outer end of each ball bearing 268, a seal 274 and retainer ring 276 are provided to seal T member 270.

To rotate shaft 266 and in turn brushes 25, a drive tube 280 is rotatably mounted without positioning tube 224 and connected at its forward end by bevel gears 282, 284 to brush shaft 266. In the shown embodiment, gear 282 is pinned to a stub shaft 286 fixed in a coupling sleeve 288 which in turn is fixed to drive tube 280. Stub shaft 286 has an enlarged collar portion 290 abutting one side of a ball bearing 292 located between the stub shaft and T member 272. An internal shoulder 294 on the T member abuts the other side of bearing 292. Seals 296 and 297 are provided between stub shaft 286 and T member 272 and coupling sleeve 288, while another ball bearing 298 is provided between coupling sleeve 288 and boom 222.

Drive tube 280 is formed in two telescoping parts in order to accommodate movement of boom 222 between its extended and retracted positions. The forward drive tube part, which will be designated 280, is slidably received within rearward drive tube part 300 and keyed to it by means of a key 302 fixed to the rear drive tube part 300 to slide in a key way 304 longitudinally formed in the forward drive tube part 280. Extending rearwardly from casing 194, the rearward drive tube part 300 is connected by any suitable coupling 306 to be driven by a hydraulic motor 307. Suitable bearings 308 are provided between the drive tube part 300 and the positioning tube 224.

The brush assembly is also equipped with means for dispensing a liquid detergent or other liquid substance for use in the washing operation. In the embodiment shown in the drawings, nozzles 310 are mounted above and below boom 222 through conduits 314 and 312 fixed to boom 222. Liquid substance is conveyed to fittings 312 and nozzles 310 for dispensing, by passage through the interior of drive tube parts 280, 300. Introduction of the liquid into the drive tube is through a suitable coupling 316 fixed about the rear end of drive tube part 300 to communicate with radial ports 318 opening into the latter. Exit of the washing liquid from forward drive tube part 280 is effected through radial ports 317 communicating with a coupling 319 fixed with respect to boom 222 by nipples 320 and nuts 321, 322. Although not specifically shown, the power lines and supply conduits for the motors and the washing liquid are carried to the brush assembly from the arm.

HYDRAULIC CONTROL SYSTEM

Figure 20:
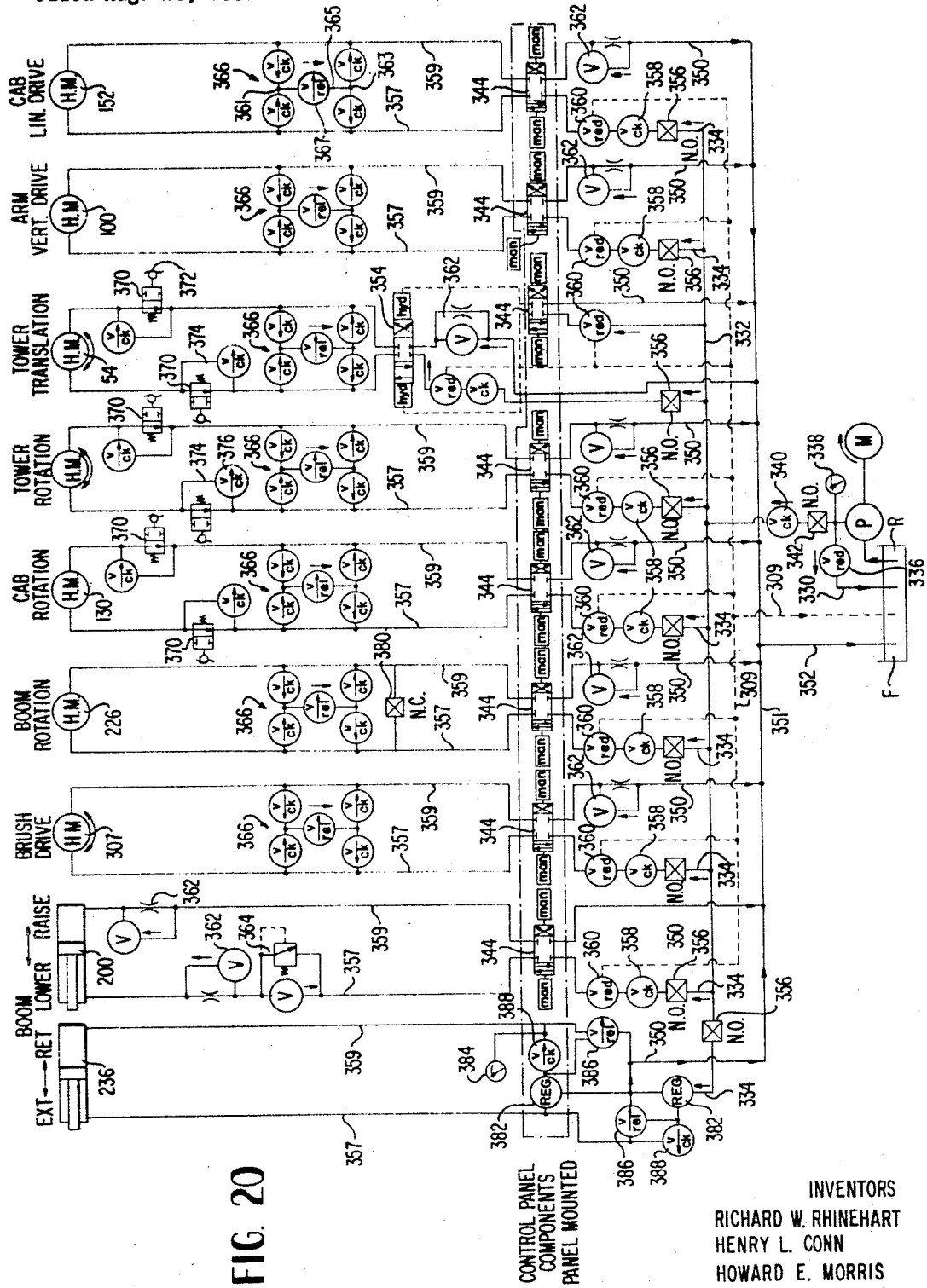
FIG. 20 is a schematic view of an hydraulic power unit and control system employed for operating the various components of the system.

Supply and exhaust of fluid to and from the various motors may be controlled by any suitable hydraulic system, one system being schematically shown in FIG. 20 wherein hydraulic fluid F is pumped from a reservoir R by a pump P driven by an electric motor M into a main supply or inlet line 330 which leads to a common supply line 332 from which branch, inlet lines 334 to the various motors. To limit pressure in line 330 say to approximately 2800 p.s.i. for a flow rate of 35 gallons per minute, a pressure reducing value 336 is placed in line 330 and a gauge 338 is also provided for indicating pressure. Backflow through line 330 is prevented by a check valve 340, while a shut-off valve 342 is provided upstream of check valve 340.

With the exception of motor 236 for extending or retracting boom 222 of the brush assembly, the remaining motors are supplied and are exhausted by means of a manually operated, four-way, three-position, control valve 344 associated with each motor. Depending on its position as controlled by the operator, valve 344 may communicate branch supply line 334 with either of lines 357 or 359 which communicate with the opposite ends of the associated motor. At the same time, valve 344 will communicate the other lines 357, 359 with branch return lines 350 leading back to reservoir R via lines 351 and 352. Thus manually operated control valves 344 are capable of selectively controlling flow to their associated motors to rotate them in either direction. The structure of valves 344 need not be elaborated upon as it is conventional and well known in this art.

In view of the fact that motor 54 for translating tower 18 is a low speed, high torque type, requiring a larger flow rate, valve 344 is used as a pilot or master valve to control the operation of a second supply-exhaust valve 354 which in turn controls the supply and exhaust of motor 54.

Each motor may be isolated from the inlet line 332 by means of an associated shut-off valve 356, and to prevent backflow in the event of pressure drop in the inlet line, a check valve 358 is provided downstream of each shut-off valve 356 in branch inlet line 334. Additionally, for reducing the supply pressure to the required control pressure, each branch inlet line 334 (with the exception of that to motor 236) is equipped with a pressure reducing valve 360 located just downstream of check valve 358. Pressure reducing valve 360 communicates with a drain line 309 leading back to reservoir R.

Flow control governing the maximum speed for the motors is obtained by flow control valves 362 situated in branch return lines 350 with the exception of motor 236 which will be described subsequently and motor 200 wherein one flow control valve 362 is provided in each of the lines 357, 359 to motor 200 since these lines alternatively act as supply and exhaust lines. Additionally, with respect to motor 200 which raises or lowers the boom of the brush assembly, a counterbalance valve 364 is provided to assure that the boom will not be self lowering in the event of hydraulic failure.

In the event of excessive torques or back pressures applied with respect to the rotary hydraulic motors, by-pass circuits generally designated 366 are provided to divert the fluid from the motor to the return lines 350. This by-pass circuit includes four check valves, two being provided in one by-pass circuit line 361 to emit fluid therein and the other two being provided in the other by-pass circuit line 363 to exit fluid therefrom. By-pass circuit lines 361 and 363 are interconnected by line 365 which has a relief valve 367 that will open at a certain pressure to permit hydraulic fluid to flow from line 361 to line 363 from which the fluid will then return to the exhaust ports of valve 344 and then to branch return lines 350 thus by-passing the associated motor.

To provide a controlled stopping of the cabin and tower at their extreme limits of travel, normally open deceleration valves 370 are provided to be actuated by cams 372 which are engaged by the cabin and tower prior to reaching their extreme positions. Actuation of the cam 372 located in the inlet to the motor, closes the associated valve 370 whereupon hydraulic fluid will flow through a by-pass line 374 upon opening check valve 376 therein. This reduces the speed of the motor and consequently the associated cabin or tower prior to reaching its extreme position. Although not shown in the drawings, mechanical stops are positioned just beyond cams 372 to positively engage and stop the cabin and tower at their extreme positions.

In addition to rotation of boom 222 by means of motor 226 to position the brush axis at a certain angle relative to the horizontal, provision is made for allowing boom 222 to rotate during the washing operation to accommodate changing contours of the aircraft surface being washed. This may be accomplished by opening shut-off valve 380 which thus in effect unlocks boom motor 226 to permit rotation in accordance with the contour of the surface being washed.

With respect to motor 236 employed for extending and retracting boom 222 and referring to the left-hand side of FIG. 20, manually operable pressure regulations 382 are provided to vary the pressure on piston ring 236 to unbalance the force on the latter to cause the desired extension or retraction of the boom. This also controls the piston ring velocity and axial force exerted on the aircraft by the brush assembly. To indicate pressure, a suitable gauge 384 is provided in the cabin. Excess pressure is relieved through relief valves 386 communicating with return lines 350, 351 and 352 leading back to the reservoir. Check valves 388 are interposed between pressure regulators 382 and relief valves 386 to prevent back flow to the pressure regulators.

From the above description, it will be seen that one operator sitting in cabin 22 may manipulate the hand controls governing valves 344 to selectively energize the motors to move the various system components for a desired washing operation.

What is claimed is:

1. A system for performing an operation such as washing a large object such as an aircraft comprising in combination; a tower, means for moving the tower in horizontal translation along a ground surface or the like, an arm supported on and extending horizontally from the tower, means for moving the arm in vertical translation along the tower, a mobile unit mounted on the arm for movement in a horizontal plane along the arm, a tool assembly including a tool for performing an operation on an object, and means movably connecting the tool assembly to said mobile unit.

2. The system defined in claim 1 further including means for rotating the tower about its vertical axis.

3. The system defined in claim 1 further including means for rotating the mobile unit about a vertical axis relative to the arm.

4. The system defined in claim 1 wherein said means for movably attaching the tool assembly to the mobile unit includes a pivotal connection allowing pivotal movement in a vertical plane relative to the mobile unit.

5. The system defined in claim 1 wherein said tool assembly includes an elongated extendible and retractable member, said tool being connected to said extendible and retractable member for extension and retraction therewith.

6. The system defined in claim 5 wherein said extendible and retractable member is also rotatable about its longitudinal axis.

7. The system defined in claim 6 wherein said tool is mounted with respect to said extendible and retractable member to be rotatable therewith.

8. The system defined in claim 7 further including a tool supporting shaft having the tool fixed thereto for rotation with the shaft, said tool supporting shaft being mounted for rotation relative to said extendible and retractable member about an axis extending at an angle to the longitudinal axis of said extendible and retractable member.

9. The system defined in claim 1 wherein said means for moving the arm relative to the tower includes a vertically extending cable having opposite ends connected to the arm and a counterweight attached intermediate the ends of the cable for biasing the arm in an upward direction.

10. The system defined in claim 1 wherein said means for moving the mobile unit along the arm includes a cable having opposite ends connected to the mobile unit and intermediate portions running along the arm, said intermediate portions including attached counterweights movable with the cable in a direction opposite to the direction of movement of said mobile unit to balance the mobile unit about the tower.

11. The system defined in claim 1 further including a fixed path, a base movable along said fixed path, said tower being supported on said base for movement therewith along said fixed path.

12. The system defined in claim 11 further including means rotatably mounting said tower to said base such that the tower may be rotated about its vertical axis relative to said base.

13. The system defined in claim 11 further including means for moving the base along said predetermined path including two cables each having one of their ends fixed with respect to the path, a pair of drums rotatably mounted on the base and receiving the opposite ends respectively of said cables.

14. A washing system for an aircraft or other large structures comprising in combination two fixed paths extending along the ground surface on opposite sides of an object to be washed, a number of washed units mounted for movement along each path, each washer unit including a vertical tower, means for rotating the tower about its vertical axis, an arm mounted on the tower for vertical movement along the tower, said arm projecting horizontally from said tower in the direction of the object to be washed, a mobile unit mounted on the arm for horizontal movement along the arm towards and away from the object to be washed, and a brush assembly movably mounted with respect to the mobile unit for engagement with the object to the washed.

15. The system defined in claim 14 wherein said mobile unit includes a cabin for receiving an operator of the washer unit, the system further including power and control means operable from within said cabin for controlling the operation of the tower, arm and brush assembly.

16. A combination mobile unit and brush assembly, the mobile unit including a body and means for suspending the top of the body from an overhead horizontal track for movement along said track and also for rotation relative to said track about a vertical axis, the brush assembly including an elongated member, means mounting one end of the elongated member to the mobile unit for movement with the mobile unit along the track as well as for movement relative to the mobile unit, a cleaning brush, means mounting the cleaning brush to the other end of said elongated member for movement therewith as well as for rotatable movement relative to the mobile unit and drive means on the elongated member for rotating the brush.

17. The combination defined in claim 16 further including a vertical support structure, a horizontal track, means mounting said track on said vertical support for vertical movement along said vertical support to change the elevation of said track, said mobile unit being suspended by said first defined means from said track for movement along said track as well as for rotation relative to said track.

18. The combination defined in claim 17 wherein said elongated member includes telescoping parts for extending and retracting the elongated member relative to the mobile unit.

19. The combination defined in claim 18 further including means pivotally connecting said one end of the elongated member relative to the mobile unit for pivotal movement in a vertical plane.

20. A system for performing an operation such as washing a large object such as aircraft comprising in combination; a vertical support structure, a horizontal support structure, first means mounting said horizontal support structure on said vertical support structure for vertical movement along said vertical support structure to change the level of said horizontal support structure, a mobile unit, a tool assembly for performing an operation on an object, means movably connecting the tool assembly to said mobile unit, and means mounting said mobile unit to said horizontal support structure for movement along said horizontal support structure as well as for movement about a vertical axis relative to said horizontal support structure.

21. The system defined in claim 20 wherein said tool assembly includes an extendible and retractable boom, said tool being mounted on the end of said extendible and retractable boom.

22. The system defined in claim 21 wherein the inner end of said boom is pivotally mounted to the mobile unit for pivotal movement in a vertical plane relative to the mobile unit.

23. The system defined in claim 22 wherein said tool is mounted for rotation relative to the boom about the longitudinal axis of the boom.

References Cited

UNITED STATES PATENTS

| 2,852,149 | 9/1958 | Bruneri et al. | 212—68 X |
| 3,196,472 | 7/1965 | Ventrella | 15—21.0 |

FOREIGN PATENTS 1,403,051   5/1965   France.

EDWARD L. ROBERTS, Primary Examiner

U.S. Cl. X.R.

15—50